Feb. 23, 1932.  F. S. CARR  1,846,791
SEPARABLE FASTENER
Filed Jan. 16, 1926
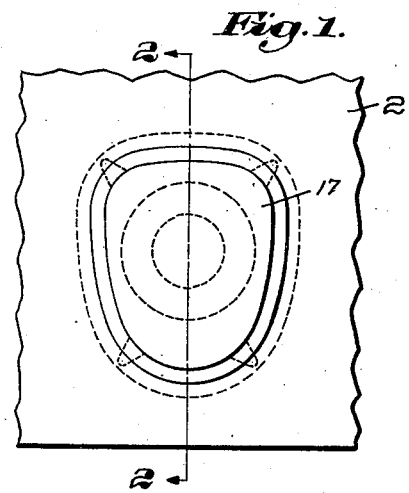
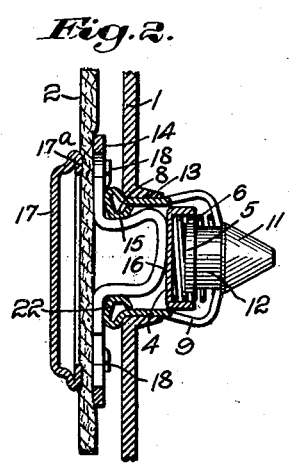
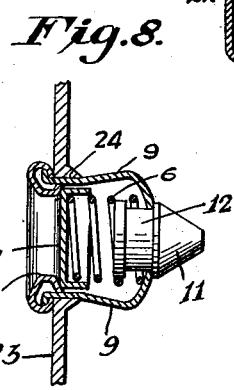
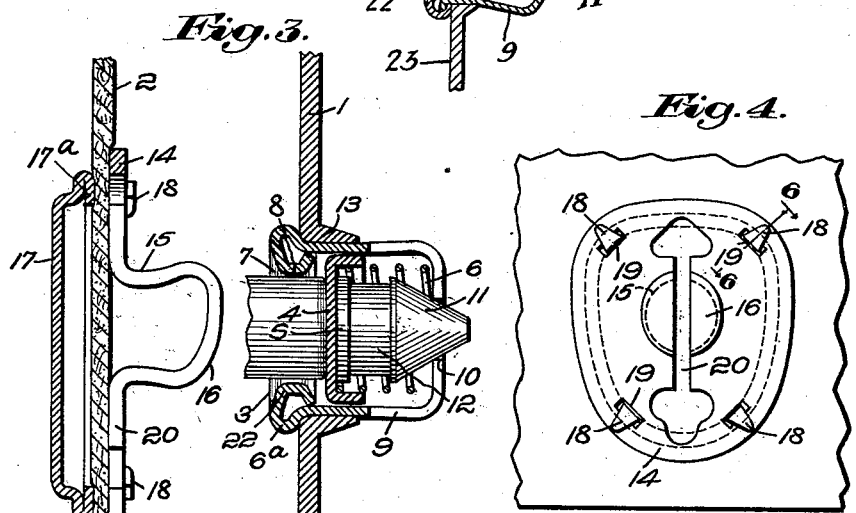
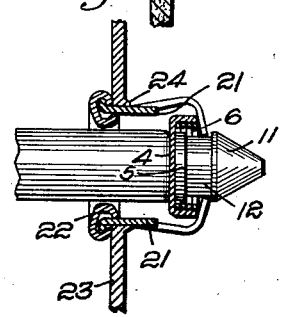
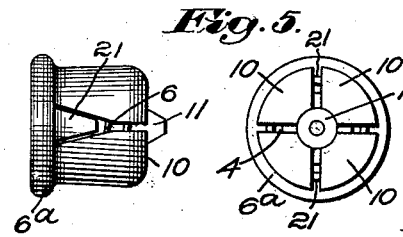
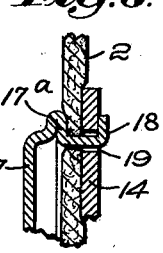
Inventor:
Fred S. Carr,
by Emery, Booth, Janney & Varney Attys Patented Feb. 23, 1932

1,846,791

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed January 16, 1926. Serial No. 81,863.

This invention aims to provide improvements in separable fasteners.

In the drawings, which illustrate two preferred embodiments of my invention:—

Figure 1 is an elevational view of a three-side lock flush type fastener;

Fig. 2 is a section on the line 2—2 of Fig. 1, being partly in elevation;

Fig. 3 is an enlarged section of the stud and socket showing a portion of a tool about to move the locking element of the socket into locking position for locking the socket to a support;

Fig. 4 is a rear elevation of the stud as secured to a flexible support;

Fig. 5 includes a side and a rear elevation of the socket before assembly with a support;

Fig. 6 is a section on the line 6—6 of Fig. 4; and

Fig. 7 is a section of a modified form of socket and socket support showing the position of the parts when the tool has moved the locking element into locking position; and Fig. 8 is a section taken through the socket and socket-carrying part to show the manner in which the expansible fingers of the socket engage with the wall surrounding the socket-receiving aperture in the carrying part to secure the socket in place.

The fastener illustrated in the drawings is a three-side lock flush type fastener, the stud being locked with the socket against separation by lateral strain transverse to the axis of the stud and socket and also locked against separation by an outward strain except when exerted at a predetermined side thereof. It is a flush type fastener because the socket is countersunk into the support in such a manner that it is substantially flush with the outer surface of the support. The socket may be used in connection with most any type of stud and is not necessarily limited to use with a stud of the type illustrated.

Referring to the drawings, and particularly to that form of my invention illustrated in Figs. 1 through 6, I have shown a socket member secured to a rigid support 1 and a co-operating stud member secured to a flexible carrying medium 2. The socket includes a casing or body portion 3 formed from a single piece of metal preferably by a series of pressing and forming operations, a closure plate 4, expanding means, herein shown as a locking member 5 and a spring 6. One end of the casing is provided with a continuous flange portion or shoulder 6a and the same end presents a stud-receiving aperture 7 surrounded by a wall 8 of substantial width which flares outwardly within the casing, as shown in Figs. 2 and 3. At the opposite end of the casing, I have provided an attaching portion which for purposes of illustration is shown as being formed into a plurality of resilient expansible fingers 9 which extend from points near the flange 6a (Fig. 5) and have inbent portions 10 terminating at a small aperture in the inner end of the casing. The fingers are preferably flared slightly adjacent the free end of the casing so that the socket may be snapped into engagement with its support.

When the socket is completely assembled, as shown in Figs. 3 and 5, the closure plate 4 is pressed against the flared portion of the wall 8 by the spring 6 and one end of the locking member 5 protrudes through the aperture at the inbent portions. The locking member is circular in cross-section and has a tapered end 11 adapted to pass between the jaws 10 and a shallow groove 12 back of the tapered portion to receive the ends of the inbent portions 10 after the tapered portion is forced therebetween.

The socket support 1 is shown as a sheet metal part which may be the body of an automobile. This sheet metal part is pre-formed to provide a socket-receiving aperture which, if desired, may be surrounded by a continuous wall 13 of substantial width thrown inwardly (Fig. 3) by the die which forms the aperture in the sheet metal part.

In assembling the socket illustrated to the rigid support 1, the socket is first passed through the socket-receiving aperture and held in engagement with the wall 13 by the resiliency of the body portion as shown in Fig. 3. While the resiliency of the body would hold the socket in place upon the support 1 without further expansion of the fingers 9, it is more desirable to lock the socket securely to the support so that it cannot be pulled free by strains exerted thereon when a stud is secured thereto. Therefore after the socket is snapped into place, a suitable tool, the end of which is shown in Fig. 3, may be inserted into the stud-receiving aperture 7 and pressed against the closure plate 4 which in turn presses against the locking member 5 and forces the tapered end thereof between the inbent portion 10 thereby spreading the fingers 9 until the ends of the inbent portions snap into the groove 12 and lock the socket to the support as shown in Figs. 2 and 7. The fingers 9 are thereafter held rigid and cannot contract to permit the socket to be separated from the support. While the extended wall 13 of the support may be omitted, it is sometimes desirable because its outer end engages the fingers at a point where substantial expansion of the casing takes place, as clearly shown in Fig. 8, and therefore is gripped much tighter to hold the socket in place and prevent rattle than if no extra thickness of the wall were provided pressing in the metal.

If the closure plate 4 and locking element 5 are omitted, the fingers may be expanded by simply inserting a tapered tool through the stud-receiving aperture and forcing it between the inbent portions 10 of the fingers 9.

The closure plate 4 is made cup-shaped to receive the spring 6 and prevent setting thereof, during the socket locking operation, by engagement with the inner end of the casing just after the jaws snap into the groove 12, as shown in Fig. 7. The closure plate also prevents forcing the locking member all the way through the aperture at the ends of the fingers during the fastener-attaching operation.

The stud member is made from a single piece of metal and has a base portion 14, a neck 15 adjacent the base portion and a head 16, the head being offset at a greater distance to one side of the neck than at the opposite side, thereby to provide a locking shoulder for locking the stud with the socket against separation by strain exerted at three sides of the stud. The attaching means for securing the stud to the flexible carrying medium 2, which may be the curtain of an automobile, may be provided in any suitable manner. However, I prefer to provide a one-piece attaching plate 17 at the front side of the curtain 2 having an inbent flange 17a to grip the curtain and a plurality of attaching prongs 18 preferably extending from the inner edge of the flange 17a and passing through the curtain, through slots 19 in the base 14 of the stud and bent outwardly and downwardly against the base 14 as shown in Figs. 4 and 6.

The stud is made contractible and expansible by a slot 20 cut across the head and extending down through the neck into the base to provide two yieldable portions of the same contour and cross-section. The ends of the slot preferably terminate adjacent to the peripheral edge and are widened to permit the expansion and contraction of the head to be provided in the base. The greatest bend occurs in the base between the ends of the slot and the edge of the base 14, so that the base may flex as a whole about these narrow portions between the ends of the slot 20 and the edge of the base. While the prongs 19 secure the stud to the fabric and strengthen the base, they are resilient to a certain degree and may flex sufficiently so as not to interfere with the flexing of the base during contraction and expansion of the head 6.

When the stud is engaged with the socket, the neck 15 contacts with the wall 8 surrounding the stud-receiving aperture 7 and the offset portion of the head 16 projects beyond the wall at that side of the aperture which is away from the lower edge of the curtain 2, as shown in Fig. 2. The head of the stud is relatively larger in diameter than the diameter of the stud-receiving aperture 7 and therefore must contract to enter the socket.

The base 14 of the stud contacts with or lies relatively close to the front face of the socket so that, if the stud starts to tip, when an upward strain is exerted on the curtain, the base contacts with the socket and provides an effective stop for preventing separation of the stud from the socket.

The head of the stud overhangs the wall 8 sufficiently at the top half of the stud to prevent separation from the socket when an accidental outward strain is exerted upon the curtain at the top or sides of the stud. At the same time the stud may be readily withdrawn from the socket by an outward pull exerted at the lower edge of the curtain as viewed in Figs. 1 and 2. Thus it will be really understood that I have provided a simple but effective three-side lock fastener which can be separated only by a pull at the lower or free edge of the support to which the stud is secured.

The shape of the head is important as regards the entrance into the socket and the locking effect against strain transverse to the axis of the stud and socket and outward strain exerted at all but one side thereof. Fig. 3 shows clearly that at the upper edge of the stud the shoulder curves gradually upwardly from the neck to the head and provides the greatest radius of the head in a vertical plane which is located further from the base of the stud than a plane parallel therewith and passing through the greatest radius of the head at the opposite or bottom edge of the stud. The bottom edge being curved to provide a relatively slight shoulder as compared with the shoulder at the top edge. By forming the head as described with the greatest radius from the axis downwardly nearer the base, the head of the stud may be forced past the wall 8 of the socket while the axis of the stud is in substantial alignment with the axis of the socket as compared with offset studs which have to be tipped to a greater extent relative to the socket before the head can enter the socket. The stud head shown in Fig. 3 enters easily into the socket because the upper portion of the head may contract and pass through the aperture just prior to contraction of the lower part.

The closure plate 4 seats against the flared portion of the wall 8 when the stud is not secured to the socket to keep dust and dirt from entering the socket and to conceal the locking element 11.

When the socket is to be secured to part of the body of a vehicle which cannot be reached from the inner side, it may be separated from the support by inserting a tool into the stud-receiving aperture to force the closure plate 4 against the end of the locking member as shown in Fig. 7. If then the tool is struck a sharp blow or pushed hard enough, the tool will cut through the closure plate and push the locking element 5 out of the socket. The shoulder 21 between the groove 12 and the end of the element 5 is so slight that the inbent portions 10 will give sufficiently to let the locking element pass out of the socket. The fingers 9 are then free to contract and the socket may then be pried loose from the support 1.

Between the fingers 9, I have provided portions 20, which remain parallel with the axis of the socket to provide means for guiding the closure plate 4 after the fingers 9 have been expanded as shown in Figs. 2 and 7.

Referring now to Fig. 7, I have shown a flush type socket installation which is substantially the same as shown and described in relation to Figs. 1 through 6. In this instance, however, the casing is formed of two pieces, namely a body portion 21 and a front plate 22. Furthermore, the socket is shown secured to a support 23 having an aperture surrounded by a wall 24 which is much more narrow than the wall shown in Figs. 2 and 3. However, the socket may adapt itself to engage walls of various width and the fingers 9 will bend from the inner edge of the wall 24, as shown in Fig. 7.

While I have shown and described two embodiments of my invention, it will be understood that changes may be made involving alteration, substitution, reversal and omission of parts, and even changes in the mode of operation, without departing from the scope of my invention, which is best defined in the following claims.

I claim:

1. A snap fastener element having a flange portion at one end thereof, a snap fastener means provided at one face of said flange portion for cooperative snap fastening engagement with another snap fastener member and an expansible portion extending from the other face of said flange portion, said expansible portion being divided by a plurality of slits and having an opening in the end thereof and an independently movable expanding element normally assembled within the fastener element prior to attachment of the fastener element to a support and adapted to be pushed axially through the open end of the expansible portion thereby to expand said expansible portion to secure the fastener element rigidly to rigid means to which it is to be attached.

2. A flush type snap fastener socket installation comprising, in combination, a rigid support having an aperture therethrough, a snap fastener socket member formed from sheet metal and having a flange surrounding a stud-receiving aperture and seated against the front face of said rigid support adjacent to the aperture therethrough, an expansible attaching portion extending from said flange through the aperture in the rigid support and means located within the expansible attaching portion prior to attachment of the snap fastener socket to the rigid support and adapted when moved axially to distort the expansible attaching portion laterally whereby said expansible attaching portion forms the only means for securing the fastener socket to the rigid support.

3. A fastener socket comprising a casing presenting at one end a stud-receiving aperture and at the other end a plurality of inbent, expansible and contractible portions terminating about an aperture and a part carried within said casing and adapted to be pressed through said last mentioned aperture to engage and expand said inbent portions for securing said socket to a rigid support.

4. A fastener socket comprising a casing presenting at one end a stud-receiving aperture and at the other end a plurality of inbent, expansible and contractible portions terminating about an aperture and a part carried within said casing and adapted to be pressed through said last mentioned aperture to engage and expand said inbent portions for securing said socket to a rigid support, and a spring pressed closure plate normally closing the stud-receiving aperture and concealing said part when viewed from the front of said socket.

5. A fastener socket comprising a casing presenting at one end a stud-receiving aperture and at the other end a plurality of inbent, expansible and contractible portions terminating about an aperture and a part carried within said casing and adapted to be pressed through said last mentioned aperture to engage and expand said inbent portions for securing said socket to a rigid support, a spring pressed closure plate normally closing the stud-receiving aperture and concealing said part when viewed from the front of said socket and means for limiting the movement of said part during the operation of expanding and locking said casing to the support.

6. A fastener socket comprising a casing adapted to be snapped through an aperture provided in a rigid support, said casing having a stud-receiving aperture in one end thereof and presenting at the inner side of the support a resilient portion adapted to hold said casing in assembly with the rigid support, and locking means in said casing adapted to be pressed through an aperture in the inner end of said casing to expand said resilient portion and lock the socket to the rigid support.

7. A fastener socket comprising a casing adapted to be snapped through an aperture provided in a rigid support, said casing having a stud-receiving aperture in one end thereof and presenting at the inner side of the support a resilient portion adapted to hold said casing in assembly with the rigid support, and an axially movable tapered locking element in said casing adapted to be snapped through an aperture in the inner end of said casing to expand said resilient portion and lock the socket to the rigid support.

8. A fastener socket comprising a casing adapted to be snapped through an aperture provided in a rigid support, said casing having a stud-receiving aperture in one end thereof and presenting at the inner side of the support a resilient portion adapted to hold said casing in assembly with the rigid support, and locking means in said casing adapted to be pressed through an aperture in the inner end of said casing to expand said resilient portion and lock the socket to the rigid support, and means providing for removal of said locking means from locking position to permit contraction of said resilient portion so that the socket may be removed from the support.

9. A fastener socket comprising a casing adapted to be snapped through an aperture provided in a rigid support, said casing having a stud-receiving aperture in one end thereof, a closure plate normally closing said aperture, a plurality of resilient fingers extending a substantial distance of the length of the casing and inbent at the inner end of the casing and adapted to be expanded against a wall surrounding a socket-receiving aperture in a socket support and other portions of said casing remaining fixed relative to the casing during the expansion of said fingers to provide guiding surfaces for said closure plate.

10. A fastener installation comprising, in combination, a rigid support presenting a rigid wall surrounding an aperture in said support, a fastener element having a snap fastener portion for cooperative engagement with another snap fastener element, an expansible portion snapped through the aperture in the support and adapted to be expanded against said wall to fix the fastener element to the support, said expansible portion having an enlarged end portion normally larger in cross-sectional area than the area of the aperture in the rigid support and expanding means assembled within the expansible portion prior to attachment of the fastener to the rigid support for expanding it against said wall.

11. A fastener installation comprising, in combination, a rigid support having an aperture therethrough, an inwardly pressed lip portion at the periphery of the aperture providing an elongated bearing surface and a snap fastener member having a flange at one end thereof engaged with the support and a resilient portion extending inwardly from said flange through the aperture in said support, said resilient portion extending beyond the inner end of said lip portion and expanded laterally to grip the lip portion so that the snap fastener member will be securely fixed to the support and a snap fastener portion presented adjacent to said flange for cooperative snap fastening engagement with another snap fastener member.

12. A three-side lock resilient stud member for engagement with a rigid socket member secured to a rigid support, said stud having a base portion, a neck, a head overhanging said stud to a greater degree at one side of the neck than at the remaining sides thereof, an attaching plate member located on the opposite side of a flexible medium from that side at which the stud is located, and attaching means presented by one of said members for securing the stud and attaching plate to the flexible medium, said attaching plate being spaced from the flexible medium so as to permit free flexing of said base.

13. A pressed metal stud for a three-side lock fastener comprising a base portion, a neck and an offset head, said stud divided by a slit extending across said head and extending along opposite sides of said neck and terminating in said base a substantial distance from said neck to permit said base to flex during contraction and expansion of said stud, said slit dividing said stud into two yieldable parts having the same contour and cross-section.

14. A pressed metal stud for a three-side lock fastener comprising a base portion, a neck and an offset head, said stud divided by a slit extending across said head and extending along opposite sides of said neck and terminating in said base a substantial distance from said neck to permit said base to flex during contraction and expansion of said stud, and a hollow attaching plate presenting a plurality of attaching prongs passing through a flexible carrying medium and through the base and clenched thereagainst to secure the stud to the inner face of the carrying medium, said prongs adapted to yield slightly during the flexing of said base and said hollow attaching plate having a portion thereof spaced from the carrying medium to permit free flexing of said base.

15. A pressed metal stud comprising a base, a neck and a head made resilient by a slit extending a substantial distance into said base, said head offset in one direction so as to provide a gradually sloping shoulder from the neck to the head for engagement with a wall surrounding a stud-receiving aperture to lock the stud against separation by a strain transverse to the axis of the stud or an outward strain exerted upon the stud adjacent to the offset portion thereof, and said stud being substantially shoulderless between the head and the neck opposite the offset portion thereby to permit separation of the stud from a socket by a pull at that side of the stud.

16. A pressed metal stud having a base, a shank pressed from said base, said shank having a neck and an offset head and said stud shank being divided by a slit to provide two yieldable portions having the same cross-section and contour, said portions being yieldable toward and away from each other.

17. A fastener element comprising a sheet metal casing having a number of fingers adapted to be passed through an aperture in a rigid support, said casing having a flange connecting said fingers to prevent passage of the fastener element entirely through the support, snap fastener receiving means adjacent to said flange and the said fingers being independent of each other at their free ends and having provision for holding the fastener element attached to the rigid support.

18. A fastener socket comprising a casing adapted to be snapped through an aperture provided in a rigid support, said casing having a stud-receiving aperture in one end thereof and presenting at the inner side of the support a resilient portion adapted to hold said casing in assembly with the rigid support, an axially movable tapered locking element located in said element and adapted to be pushed through an aperture in the inner end of said casing to expand said resilient portion and lock the socket to the rigid support and a cup-shaped spring-pressed closure plate normally closing the stud-receiving aperture but adapted to be pressed against the tapered locking element to move the locking element into the aperture in the inner end of the resilient portion while preventing passage of the locking element entirely through the said aperture during the attaching operation.

19. A snap fastener installation comprising, in combination, a rigid support presenting a rigid wall surrounding an aperture in said support, a snap fastener element having an expansible portion at one end thereof in the form of spring fingers passing through the aperture in the support and adapted to be expanded against said wall to fix the snap fastener element to the support, a continuous flange portion formed on the snap fastener element, thereby preventing the snap fastener element from passing through the support, a continuous wall portion extending from the outer periphery of the flange portion thereby forming means for separable snapping engagement and disengagement with another snap fastener element.

20. A fastener assembly including a supporting part having a hole therein, a fastener element having a cup portion passing into the hole in the supporting part, a flange extending from said cup portion and seated against the outer face of the supporting part, attaching means provided by expanding portions of said cup portion to prevent the cup portion from falling out of the hole in the support, a fastener portion presented for cooperative engagement with a cooperating fastener element and a spring-pressed follower in the cup for closing the mouth of the cup.

21. A fastener assembly including a supporting part having a hole therein, a flush type fastener element comprising a socket having a cup portion passing into the hole in the supporting part, a flange extending from said cup portion and seated against the outer face of the supporting part, attaching means provided by expanding portions of said cup portion to prevent it from falling out of the hole in the supporting part, means providing a stud-receiving aperture at the mouth of the cup portion and a spring-pressed follower within the cup portion normally closing the stud-receiving aperture.

22. A snap fastener member having fastener-receiving means at one end for cooperation with another snap fastener member, an attaching portion at the opposite end of the fastener member, said attaching portion being slit to provide a yieldable outer wall, inwardly bent portions extending into the attaching portion surrounding an aperture at the free end of said attaching portion and an axially movable expanding element assembled within the fastener element and having a tapered portion for engagement with said inwardly bent portions to expand said yieldable outer wall when pressed toward the said aperture.

23. A snap fastener installation comprising, in combination, a rigid support having an aperture therethrough, a snap fastener element formed from sheet metal and having a flange portion engaging the outer face of the support to prevent the snap fastener element from passing entirely through the support, means extending from said flange portion and providing a portion for engagement with a cooperating snap fastener element, and an attaching portion extending from said flange portion through the aperture in the support for securing the fastener element against accidental disengagement from the support, said attaching portion having expansible spring finger portions of substantial length extended parallel with the axis of the fastener element and being adapted to yield at their points of connection with the attaching portion adjacent to the support.

24. A snap fastener installation comprising, in combination, a rigid support having an aperture therethrough, a snap fastener element formed from sheet metal and having a flange portion engaging the outer face of the support to prevent the snap fastener element from passing entirely through the support, means extending from said flange portion and providing a portion for engagement with a cooperating snap fastener element, an attaching portion extending from said flange portion through the aperture in the support for securing the fastener element against accidental disengagement from the support, said attaching portion having expansible spring finger portions of substantial length extending parallel with the axis of the fastener element and being adapted to yield at their points of connection with the attaching portion adjacent to the support, and axially movable means normally located within the attaching portion and adapted to be moved in a direction away from the flange portion to expand the said fingers as and for the purposes described.

25. A fastener installation comprising, in combination, a rigid support presenting a rigid wall surrounding an aperture in said support, a fastener element having an inwardly extending flange providing snap fastener means for cooperative engagement with another snap fastener, an expansible portion snapped through the aperture in the support and adapted to be expanded against said wall to fix the fastener element to the support, and axially movable means independent of the flange which provides the snap fastening means for cooperation with another snap fastening member, said axially movable means being normally assembled within the expansible portion prior to attachment of the fastener element to the support for expanding said expansible portion against said wall.

26. A snap fastener installation comprising, in combination, a rigid structure to which another part is to be attached by means of separable snap fastening members, said structure having an aperture therethrough, a snap fastener member having a flange engaging the front face of said structure adjacent to the aperture therethrough, an expansible portion extending from said flange through said aperture in said structure and being expanded laterally throughout its length beginning immediately beyond the inner face of said structure, axially movable means normally assembled with said expansible portion and moved away from said flange thereby expanding said expansible portion whereby said expansible portion cooperates directly with the structure, whatever its thickness may be within the limits of the length of said expansible portion, to provide the only means for holding said snap fastener member in fixed relation to said structure and means extending from said flange portion to provide one of the elements of the separable snap fastening members for engagement with the snap fastening member attached to the said other part thereby to secure said other part to said rigid structure.

27. A snap fastener installation comprising, in combination, a rigid structure to which another part is to be attached by means of separable snap fastening members, said structure having an aperture therethrough, a snap fastener member having a shoulder engaging the front face of said structure adjacent to the aperture therethrough, an expansible portion extending through said aperture in said structure and being expanded laterally throughout its length beginning immediately beyond the inner face of said structure, axially movable means normally assembled with said expansible portion and moved away from said shoulder, thereby expanding said expansible portion whereby said expansible portion cooperates directly with the structure, whatever its thickness may be within the limits of the length of said expansible portion, to provide the only means for holding said snap fastener member in fixed relation to said structure and snap fastener engaging means provided as a part of said snap fastener member and located at the front side of the rigid structure to provide one of the elements of the separable snap fastening members for engagement with the snap fastener member attached to the said other part, thereby to secure said other part to said rigid structure.

In testimony whereof, I have signed my name to this specification.

FRED S. CARR.